(12) United States Patent
Santandrea

(10) Patent No.: US 7,926,749 B2
(45) Date of Patent: Apr. 19, 2011

(54) APPARATUS FOR TREATING ORGANIC WASTE MATERIAL

(75) Inventor: Marco Santandrea, Barberino Val d'Elsa (IT)

(73) Assignee: ATOP S.p.A., Barberino Val d'Elsa, Florence (IT)

( * ) Notice: Subject to any disclaimer, the term of this patent is extended or adjusted under 35 U.S.C. 154(b) by 353 days.

(21) Appl. No.: 12/306,139

(22) PCT Filed: Jun. 29, 2007

(86) PCT No.: PCT/EP2007/005793
§ 371 (c)(1),
(2), (4) Date: Dec. 22, 2008

(87) PCT Pub. No.: WO2008/000510
PCT Pub. Date: Jan. 3, 2008

(65) Prior Publication Data
US 2009/0189002 A1    Jul. 30, 2009

(30) Foreign Application Priority Data

Jun. 30, 2006 (IT) ................ PI2006A0077
Jun. 3, 2007 (IT) ................ PI2007A0022

(51) Int. Cl.
*B02C 17/02* (2006.01)
(52) U.S. Cl. .............. 241/24.11; 241/100; 241/285.2

(58) Field of Classification Search .......... 241/100, 241/24.11, 285.2
See application file for complete search history.

(56) References Cited

U.S. PATENT DOCUMENTS

| 2,087,101 | A | * | 7/1937 | Cerracchio | 241/95 |
| 5,566,890 | A | * | 10/1996 | Ricciardelli | 241/20 |
| 5,722,604 | A | * | 3/1998 | Dudley | 241/24.11 |
| 5,772,127 | A | * | 6/1998 | Maciejewski et al. | 241/21 |
| 6,494,391 | B2 | * | 12/2002 | Mosenson et al. | 241/36 |
| 6,732,962 | B1 | * | 5/2004 | Butler | 241/57 |

FOREIGN PATENT DOCUMENTS

| WO | WO01/68481 | 9/2001 |
| WO | WO2004/083076 | 9/2004 |
| WO | WO2005/120712 | 12/2005 |
| WO | WO2006/013611 | 2/2006 |

* cited by examiner

*Primary Examiner* — Bena Miller
(74) *Attorney, Agent, or Firm* — Ropes & Gray LLP; Jeffrey H. Ingerman

(57) ABSTRACT

The apparatus for treating waste (50, W), in particular organic waste, comprises from the above to below: a loading section (2, 101), a grinding section (3, 102) and a section (4, 107) for storing the waste. A possible succession of steps of a functioning cycle of the apparatus starts with opening a loading container (21, 104), for example by using a handle (24, 160), and loading the waste (50, W) that requires treatment inside the apparatus. The container comprises a box-like body (22) and a base (23), which can move with respect to the body for bringing the container from a waste supporting configuration to a waste releasing configuration in the grinding section.

20 Claims, 13 Drawing Sheets

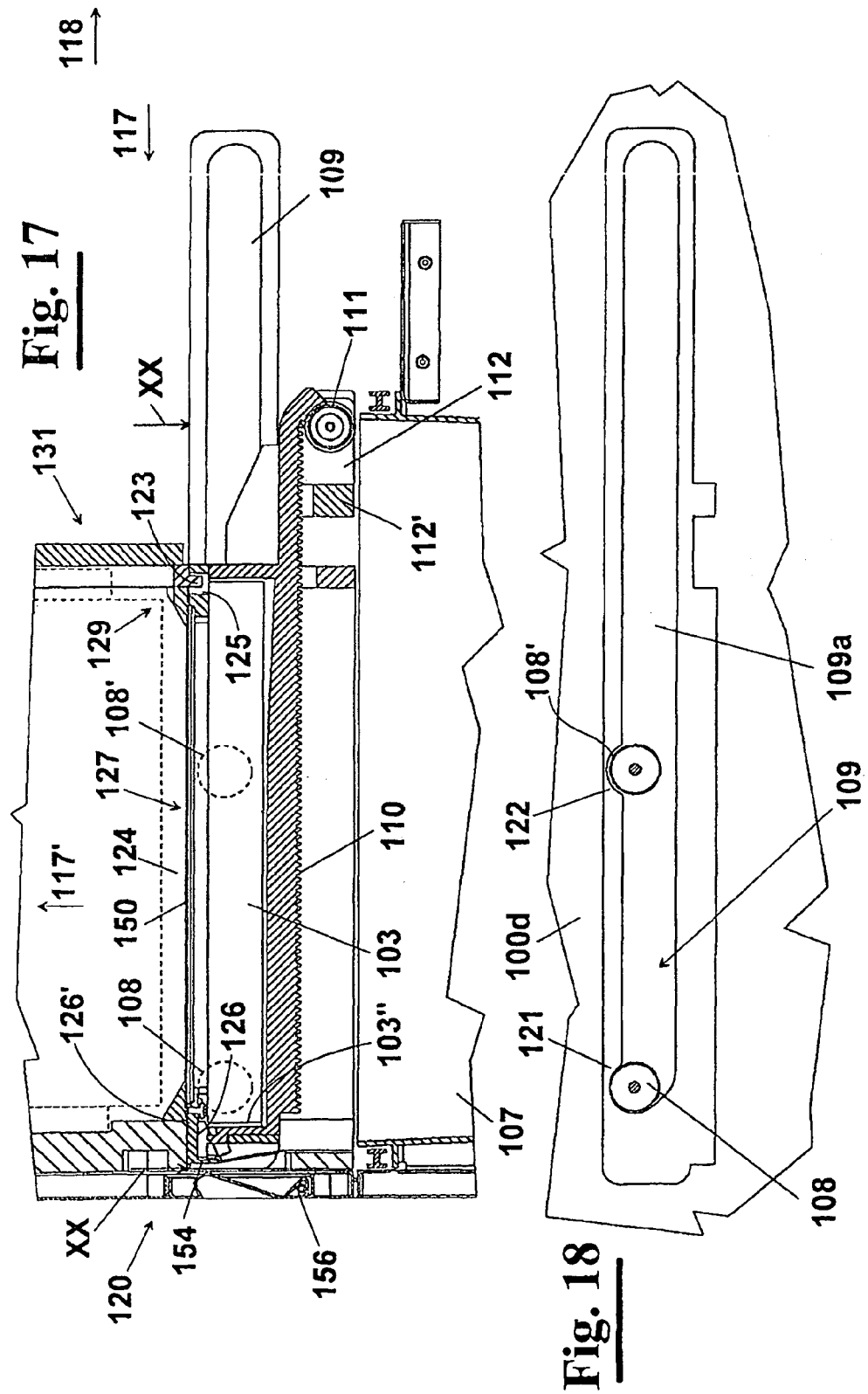

APPARATUS FOR TREATING ORGANIC WASTE MATERIAL

FIELD OF THE INVENTION

The present invention concerns an apparatus for treating organic waste of various types, in particular from vegetables, fruit, and foodstuff in general. The waste is finely ground before delivery to a public collection centre to reduce the volume, limit the generation of bacteria and consequently produce a lower environmental impact. The invention has practical use in selective waste collection and composting.

BACKGROUND OF THE INVENTION

It is known that organic waste material that is left for considerable time in common domestic bins for selective collection can produce unpleasant smell and favour the formation of bacteria. To limit these situations, it is preferable to process the waste in specific compacting machines that reduce its size.

The existing apparatus for treating organic waste grind the material so that it is delivered to the public collection and disposal systems with a lower environmental impact.

However, the existing apparatus frequently have undesirable accumulation of waste between the mechanical parts, which produces germs and bacteria that can freely proliferate and become a source of unpleasant odour. This situation requires frequent maintenance intervention to clean the inside of the apparatus.

Furthermore, known apparatus have a complicated construction, and during working cycles they are subject to frequent jamming of mechanical parts depending on the waste being treated. In these situations the apparatus has to be promptly stopped to avoid damage, and the jammed material needs to be removed manually.

The apparatus needs to be suitable for a practical utilization, assisting the steps of introducing the waste to be ground and removing the treated waste, as well as adapted to easy inspecting and cleaning steps of the grinding area.

Furthermore, due to the fact that the waste is frequently loaded by opening and closing a loading container and actuating each time various internal mechanisms, the apparatus needs to guarantee a long life to the mechanical couplings without the risk of jamming and with minimum wear of the moveable parts.

Finally, it is necessary to avoid leakages of the waste inside the machine when grinding in order to keep clean the parts that are not involved with the passage of ground solid parts and liquid residues.

SUMMARY OF THE INVENTION

It is therefore an object of the invention to provide an apparatus for treating waste, in particular organic waste, which reduces the possibility of waste accumulation in the various parts of the apparatus and therefore avoids unpleasant smell as well as germs and bacteria to proliferate.

It is another object of the invention to provide an apparatus for treating waste, in particular organic waste, which is more compact and optimizes the available space.

It is a further object of the invention to provide such an apparatus, which is simple in its construction and capable of efficiently grinding the waste with a consequent reduction of its volume.

It is another object of the invention to provide an apparatus for treating waste, which can assist the steps of loading the waste and allow an immediate separation of the liquid parts from the solid parts.

It is another object of the invention to provide an apparatus for treating waste in which ordinary maintenance can be easily performed, and where the steps of extracting and cleaning the parts where the passage of the waste occurs are simple.

It is another object of the invention to provide an apparatus for treating waste, in particular organic waste, which maximizes the separation between ground solid parts and liquid parts that can be discharged in order to increase the compactness of the solid waste, and to avoid that waste solid parts clogs the liquid residues discharge system.

These and other objects are accomplished by the apparatus for treating organic waste according to the invention, comprising, from the above towards below:
 a loading section equipped with a waste loading container;
 a grinding section comprising means for grinding the waste arriving from the loading section;
 a storing section for storing waste that has been ground in the grinding section;
 characterised in that the container is equipped with a partition member that is moveable between a first and a second position for allowing the container to pass from a waste supporting configuration to a configuration for allowing the waste to be released to the grinding section.

In particular, the container can be moveable between a position external to the apparatus, where the container has a supporting configuration that allows loading the waste, and a position internal to the apparatus where the container has a waste releasing configuration.

Advantageously, the container comprises a box-like body and a base that is moveable with respect to the body between the first and the second position for allowing the container to pass from the supporting configuration to the releasing configuration.

Preferably, the base comprises a support plane that is substantially perpendicular to the side walls of the box-like body.

In addition, the base can comprise two side walls to which are perpendicular to the support plane and are capable of partially facing the side walls of the box-like body in the supporting configuration.

Advantageously, the base is assembled to slide on guides and has movement with respect to the box-like body which can be actuated by using first transmission means and motor means.

In particular, the first transmission means can be selected from the group comprised of:
 rack gears
 ballscrews;
 transmission belts
 transmission chains Alternatively, the motion of the base with respect to the box-like body can be caused by a pneumatic or hydraulic actuator.

In particular, a sealing member can be provided between the base and the box-like body.

In addition, the container can be completely removed from the apparatus for cleaning purposes.

According to a further aspect of the invention, an apparatus for treating organic waste according to the invention comprises, from the above to below;
 a loading section equipped with a waste loading container;
 a grinding section comprising means for grinding the waste arriving from the loading section;

a storing section for storing waste that has been ground in the grinding section:

wherein a collection container is arranged between said means for grinding and said storing section; the collection container being moveable between a barrier position for blocking an access of the waste towards the storing section and a access position, that allows the waste to reach the storing section.

Advantageously, the motion of the collection container between the access position and the barrier position can be actuated by using a second transmission means and a second motor means.

Alternatively, the motion of the collection container can be generated by a pneumatic or hydraulic actuator.

In particular, the grinding means are connected to third motor means by a quick-release coupling means, which allows the grinding means to be reciprocally coupled or released. In this way, the grinding means can be removed from the apparatus independently of the third motor means. More in detail, the grinding means are slidingly assembled on reference guides, which guarantee a correct positioning of the grinding means inside the grinding section with respect to the third motor means so that a correct reciprocal connection with the quick-release coupling means can be achieved.

Advantageously, a grate member is provided between the grinding means and the collection container for allowing the passage of the waste liquid residues and blocking the solid waste that has been treated.

In particular, once the grinding means have been extracted from the apparatus, the grate member is easily accessible from the outside for its removal and cleaning.

In addition, the collection container can be connected to a discharge tube through which the liquid portion of the treated waste can be conveyed away and eventually also the disinfectant solution for impeding the putrefaction of the treated organic waste.

BRIEF DESCRIPTION OF THE DRAWINGS

The invention will now be described with reference to the following description relating to exemplary embodiments thereof, which are exemplifying but not limitative, and with reference to the attached drawings, wherein:

FIG. 14 illustrates the apparatus of the invention loaded with waste residues W that need to be ground and successively stored within the apparatus. Furthermore, the apparatus is in a condition of collecting liquid parts, coming from the grinding section, by a collection container 103, like FIG. 1. FIG. 14 is a cross sectional view taken according to arrows 14-14 of FIG. 21. Certain parts have been omitted in FIG. 14 for reasons of clarity.

FIG. 17 is an enlargement view of area 17 of FIG. 14 illustrating the collection container aligned with the grinding section when liquid needs to be collected from the grinding section.

FIG. 18 is a view similar to FIG. 17, as seen according to arrows 18-18 of FIG. 20 illustrating a part of the solutions used for moving the collection container.

DESCRIPTION OF THE PREFERRED EMBODIMENTS

With reference to FIGS. 1 to 5, an apparatus 1 for treating waste, in particular organic waste, comprises from the above to below: a loading section 2, a grinding section 3 and an unloading section of the treated waste 4.

Figure 1:
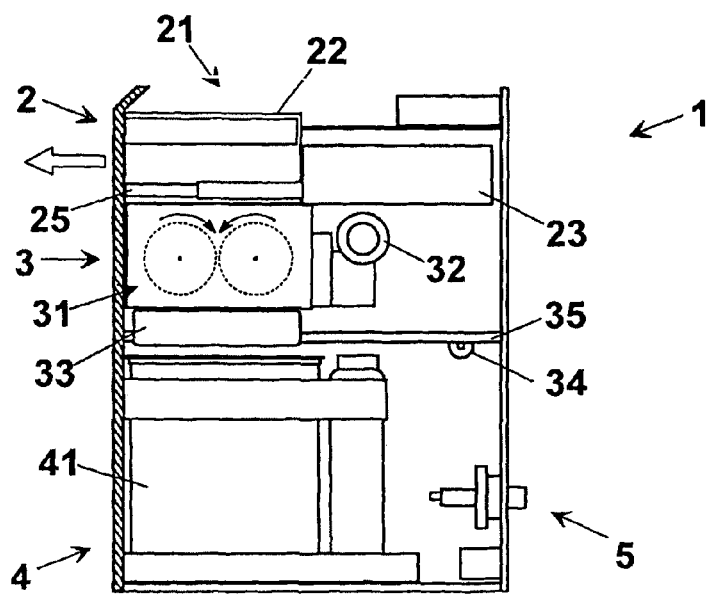
FIGS. 1 to 5 are schematic illustrations of a possible succession of steps concerning a functioning cycle of the apparatus for treating organic waste according to the invention.
Figure 2:
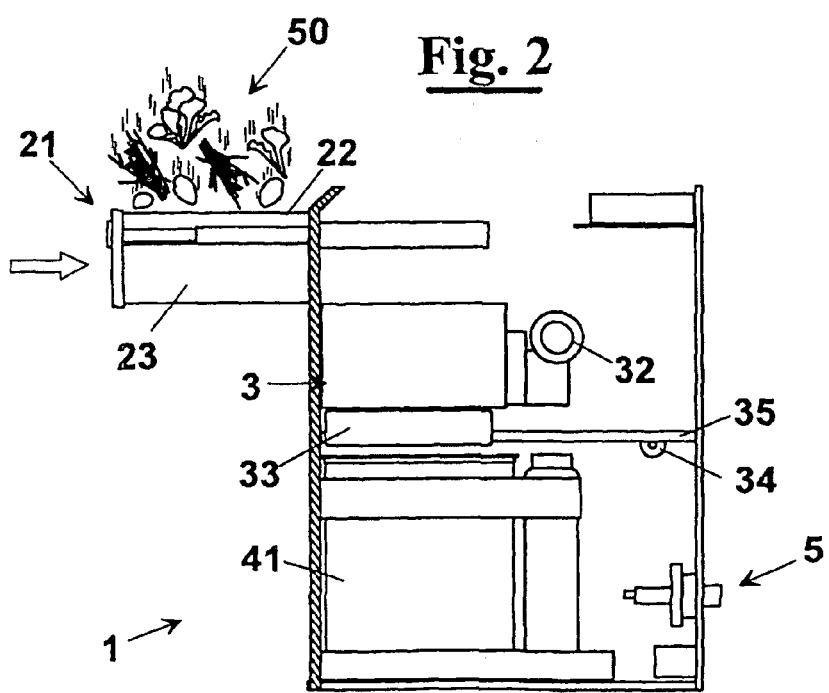
Figure 6:
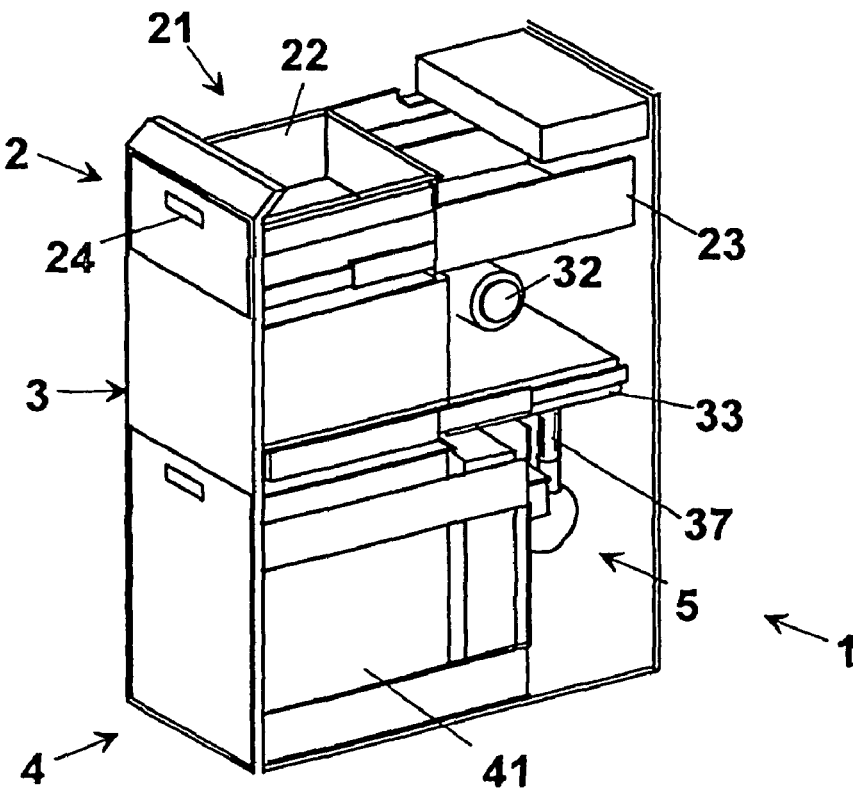
FIGS. 6 and 7 are perspective views according to elevation side views of the apparatus illustrated in FIGS. 1-5.
Figure 7:
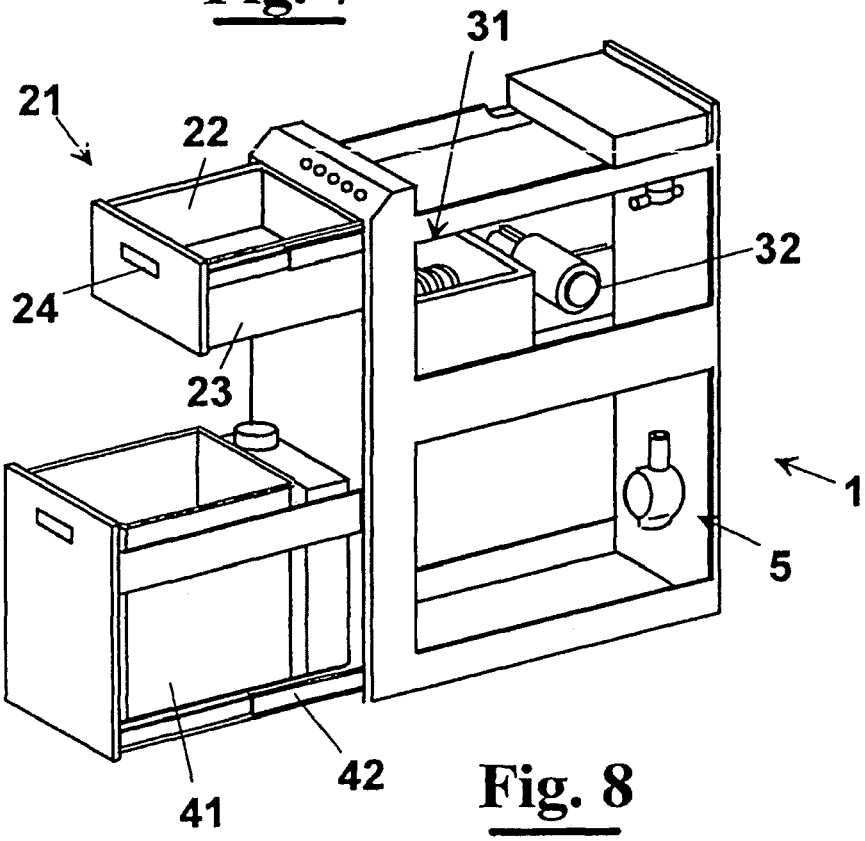

More in detail, a particular succession of steps of apparatus 1 starts with opening loading container 21 (FIG. 1), for example by a handle 24 (FIG. 6), for introducing waste 50 that needs to be treated inside the apparatus (FIG. 2).

Figure 3:
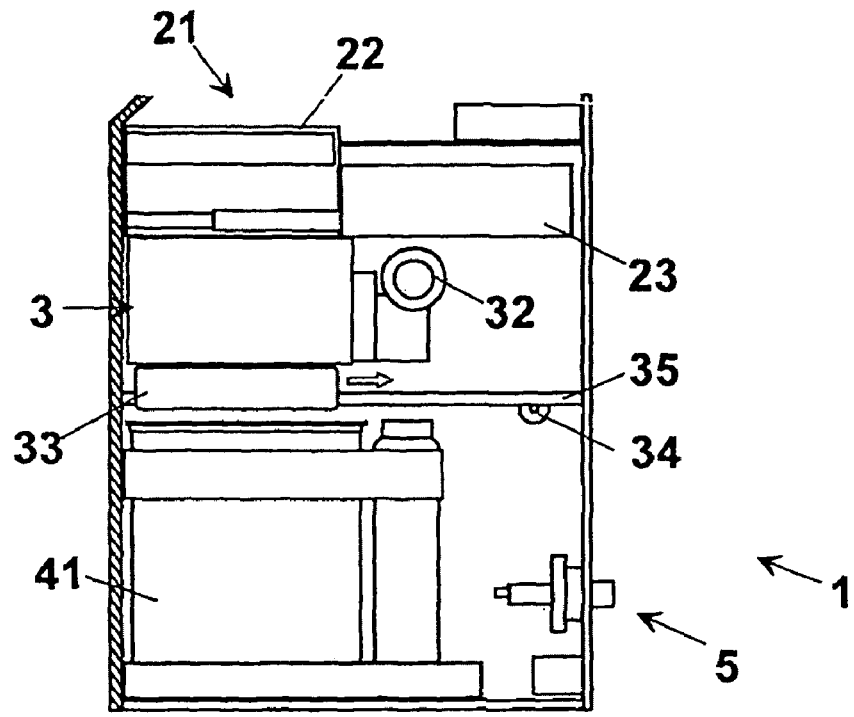
Figure 4:
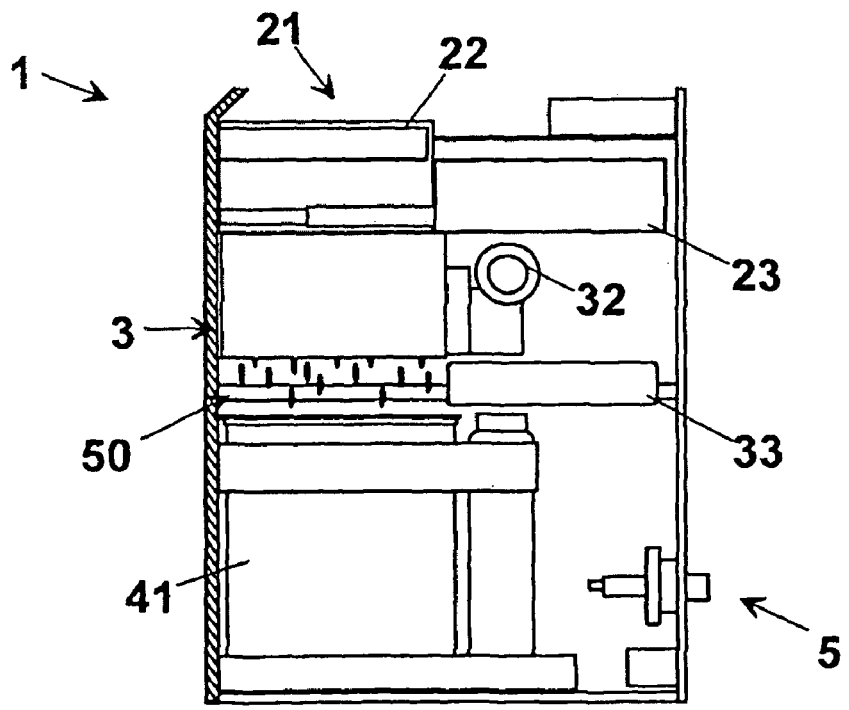
Figure 5:
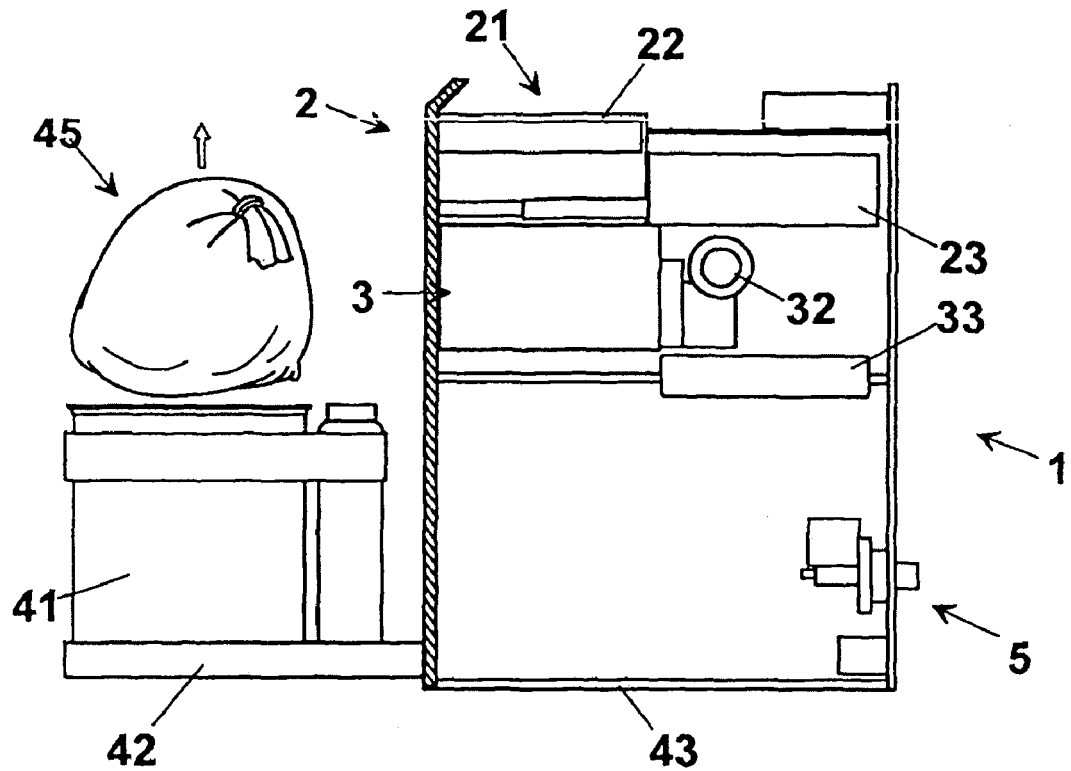

In particular, the loading container 21 comprises a box-like body 22 and a base 23. Base 23 can slide with respect to the body so that container 21 passes from a supporting configuration for waste 50 (FIGS. 1 and 2) to a releasing configuration of the waste towards grinding section 3 (FIGS. 3 and 4).

Figure 8:
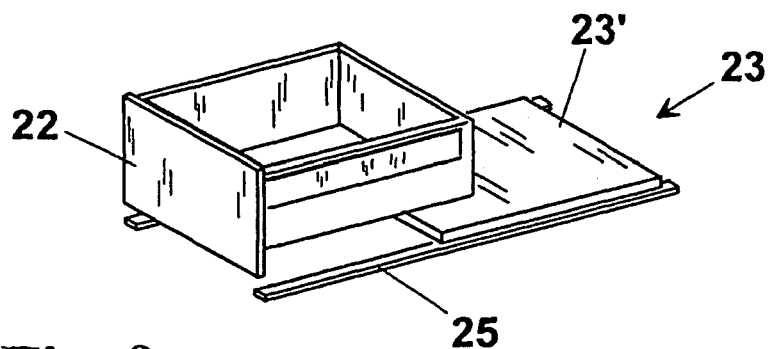
FIGS. 8 and 9 are perspective views of two possible embodiments of the loading container provided in the apparatus of FIGS. 1 to 7.
Figure 9:
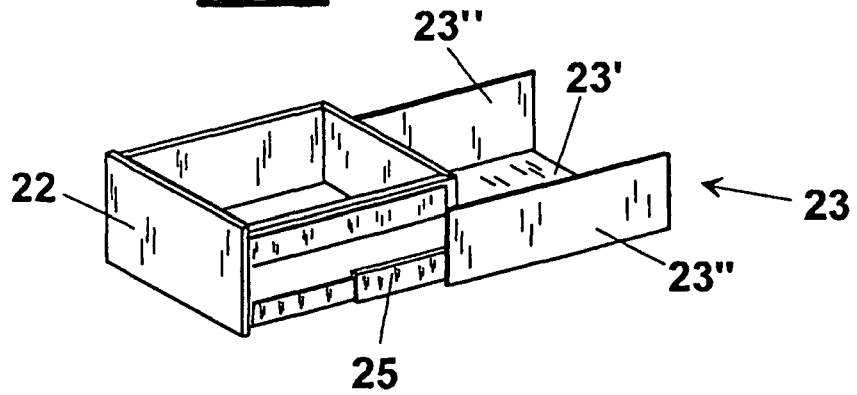

Base 23 can be a simple support plane 23' (FIG. 8), or can be equipped with side walls 23" substantially perpendicular to plane 23'. Side walls 23" of base 23 faces the side walls of box-like body 22 when container 21 is in the supporting configuration (FIG. 9).

In the first case, base 23 can be assembled so that it slides on guides 25, which are positioned below box-like body 22. In the second case, guides 25 can be placed lateral with respect to box-like body 22 (FIG. 9). The motion of base 23 with respect to box-like body 22 can be accomplished by using a motor, as well as a pneumatic or hydraulic actuator.

In the releasing configuration of container 21, the loaded waste falls into the grinding section, which is equipped with grinding means 31, for example a series of blades placed on the periphery of two drums that oppositely rotate with respect to each other to produce thin grinding of treated waste 50.

Figure 10:
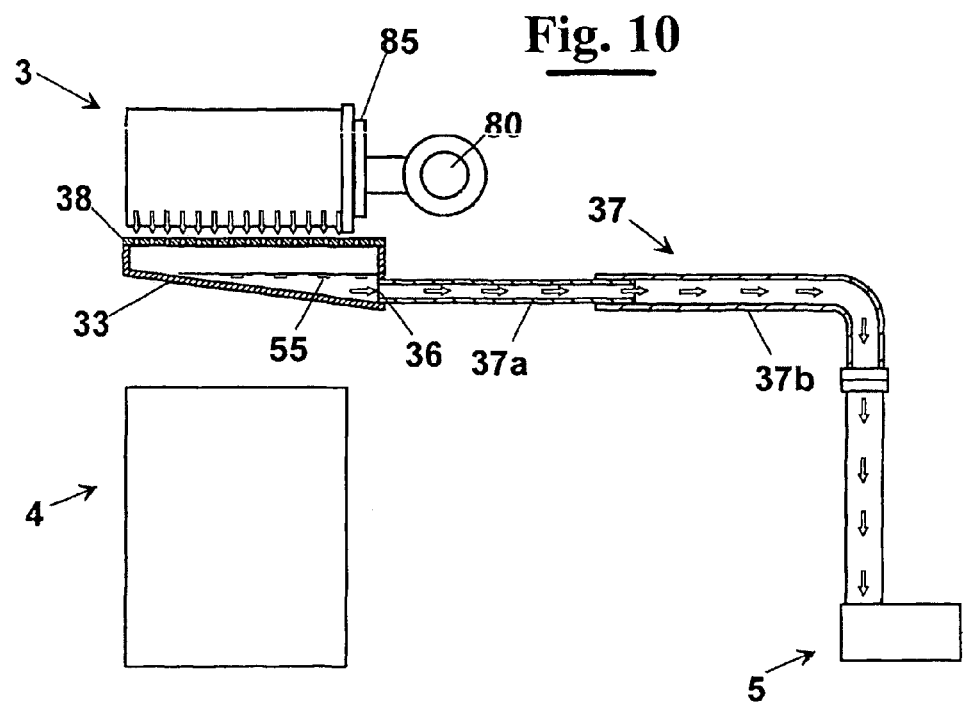
FIGS. 10 to 13 schematically illustrate the waste grinding and storing sections the according to various functioning steps in order to highlight certain functional aspects.

A collection container 33 is provided below the grinding means. Collection container 33 can slide between a barrier position with respect to storing section 4 (FIGS. 1 and 3) and an access position, for allowing access to storing section 4 (FIG. 4). In particular, before turning the grinding means 31, collection container 33 is placed in the barrier position to prevent waste liquid residues 50 and a disinfectant solution (if used) from entering storing section 4. Collection container 33 is in fact connected to a discharge tube 5 of apparatus 1, and therefore to a local sewage system, by means of a telescopic tubing 37. Liquid residues 55 access tubing 37 through an aperture 36 (FIG. 10).

More in detail, tubing 37 comprises two portions 37a and 37b assembled telescopically for following the movement of collection container 33 between the barrier configuration (FIG. 10) and the access configuration (FIG. 11) to storing section 4.

Once the greater part of the waste liquid residues 50 has flowed away, collection container 33 is brought to the position for access to storing section 4. The grinding means are then actuated to finely grind waste 50, which successively reaches a storage container 41 (FIG. 4). Waste 50 can be removed from storage container 41, for example by removal of a common plastic bag 45 that is arranged therein.

With reference to FIGS. 10 to 13, grinding means 31 are driven by motor means 80, for example a motor and reduction gear unit. The grinding means 31 are connected to motor means 80 by a quick-release coupling 85, which allows reciprocal engagement and disengagement.

Figure 11:
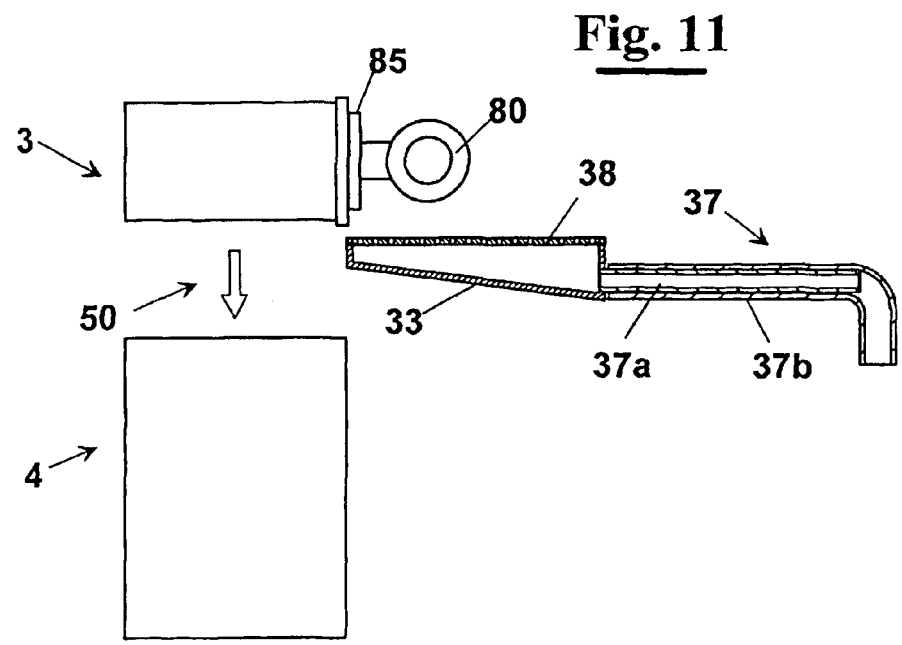
Figure 12:
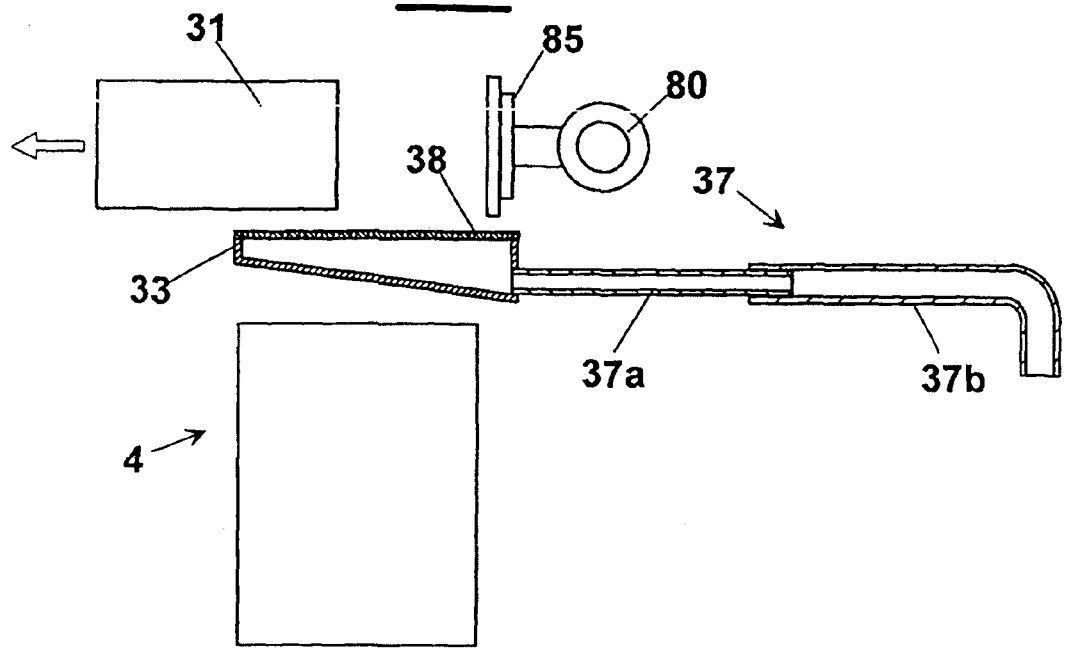

In particular, grinding means 31 can be removed from apparatus 1, independently of motor means 80, for cleaning and possible removal of any waste particulate (FIG. 11). Furthermore, the grinding means 31 can be assembled to slide on reference guides, not shown in the figures. When necessary, these guides favour correct repositioning of the grinding means inside apparatus 1 with respect to the quick-release coupling 85 and consequently connection to motor means 80.

Figure 13:
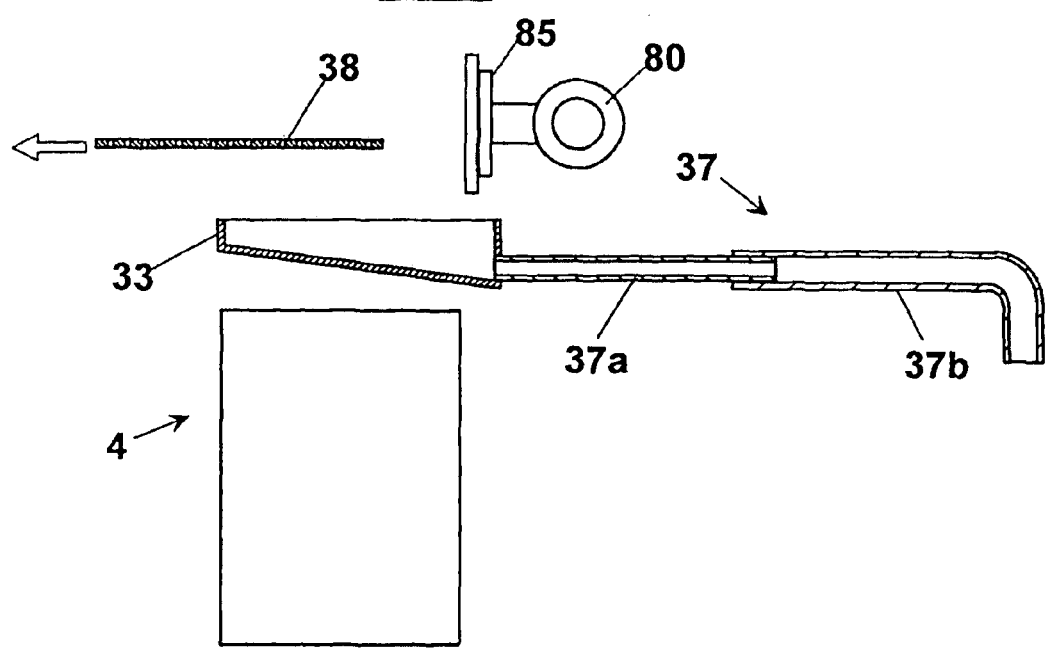

A grate member 38 is provided between grinding means 31 and storing section 4. Grate member 38 is capable of blocking eventual solid particulate without impeding the liquid flow within collection container 33 (FIG. 10). Once the grinding means 31 have been extracted from apparatus 1, also grate member 38 can be easily removed for cleaning purposes (FIG. 13).

The movement of base 23 with respect to box-like body 22, and similarly the movement of collection container 33, can be obtained by using a motor and relative transmission means, or by using a pneumatic or hydraulic actuator. For example, as schematically shown in FIGS. 1-5, collection container 33 can be assembled on a ballscrew 35, which rotates around its axis by means of motor 34. Furthermore, container 21 can be completely extracted from apparatus 1, easily and without any washing and cleaning tools.

Figure 14:
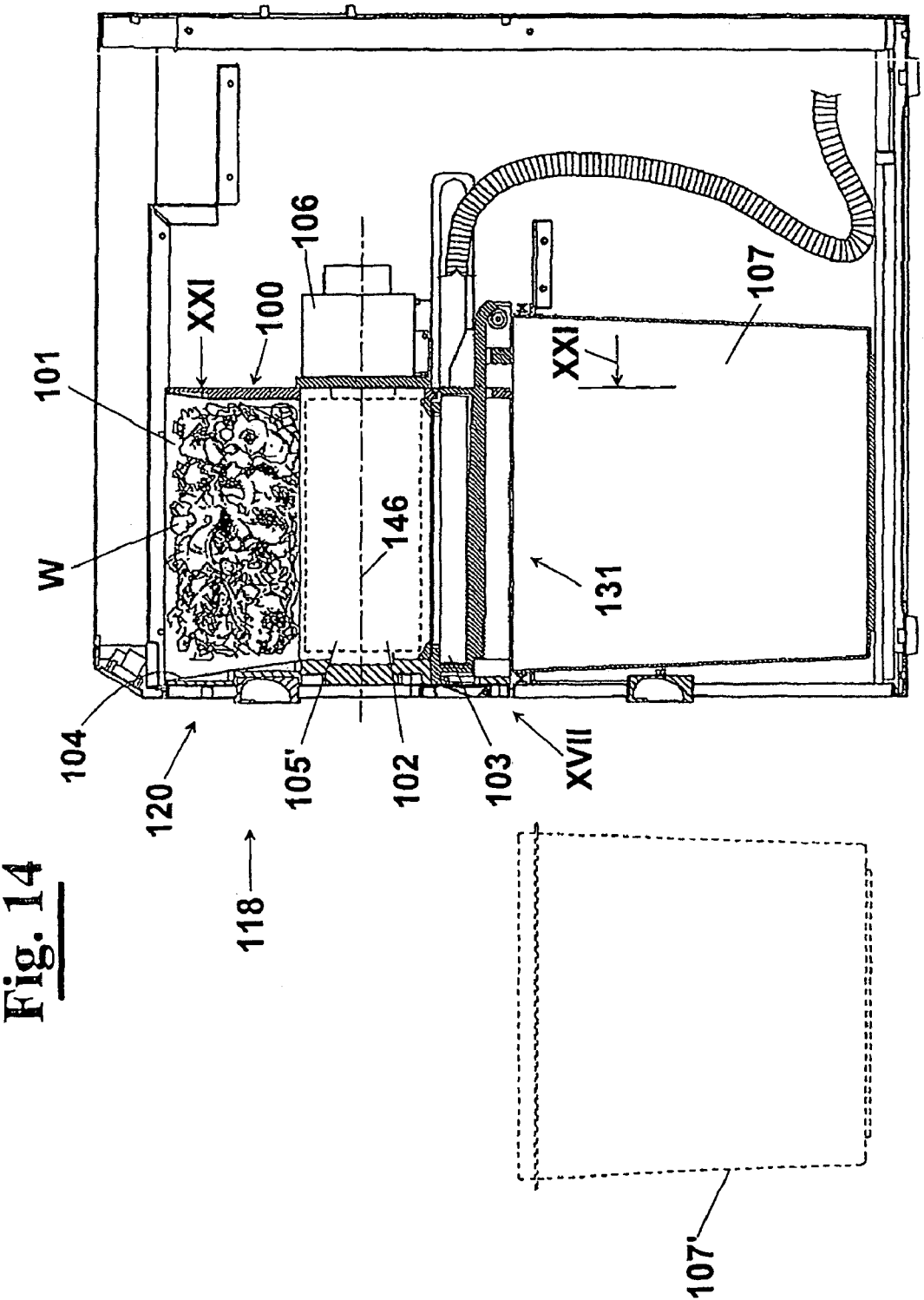
FIG. 14 is an elevation cross sectional view similar to FIGS. 1 and 2 of a further embodiment according to the invention.
Figure 15:
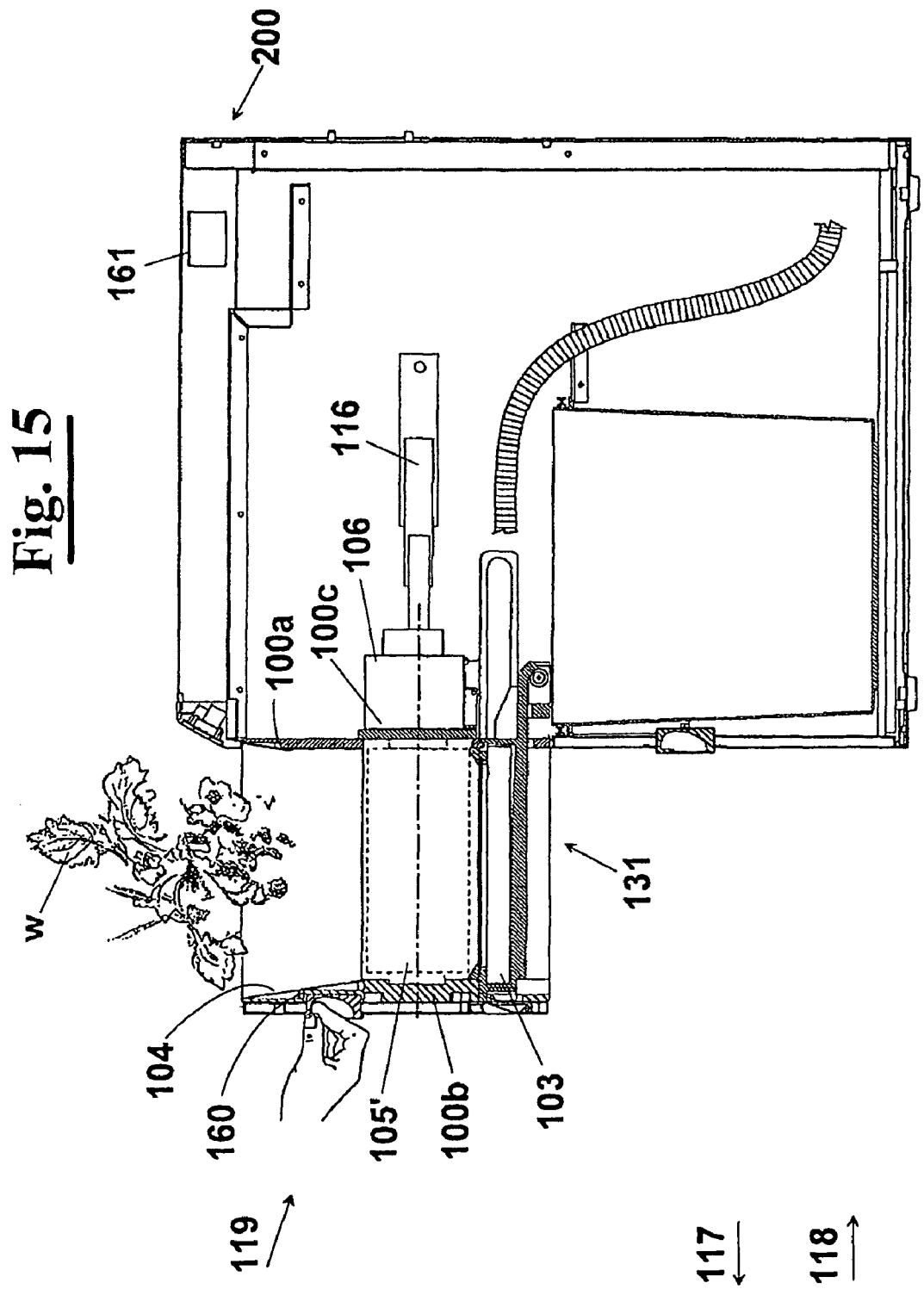
FIG. 15 is a view similar to FIG. 14 illustrating the apparatus being loaded with waste residues W by a user, like FIG. 2.
Figure 16:
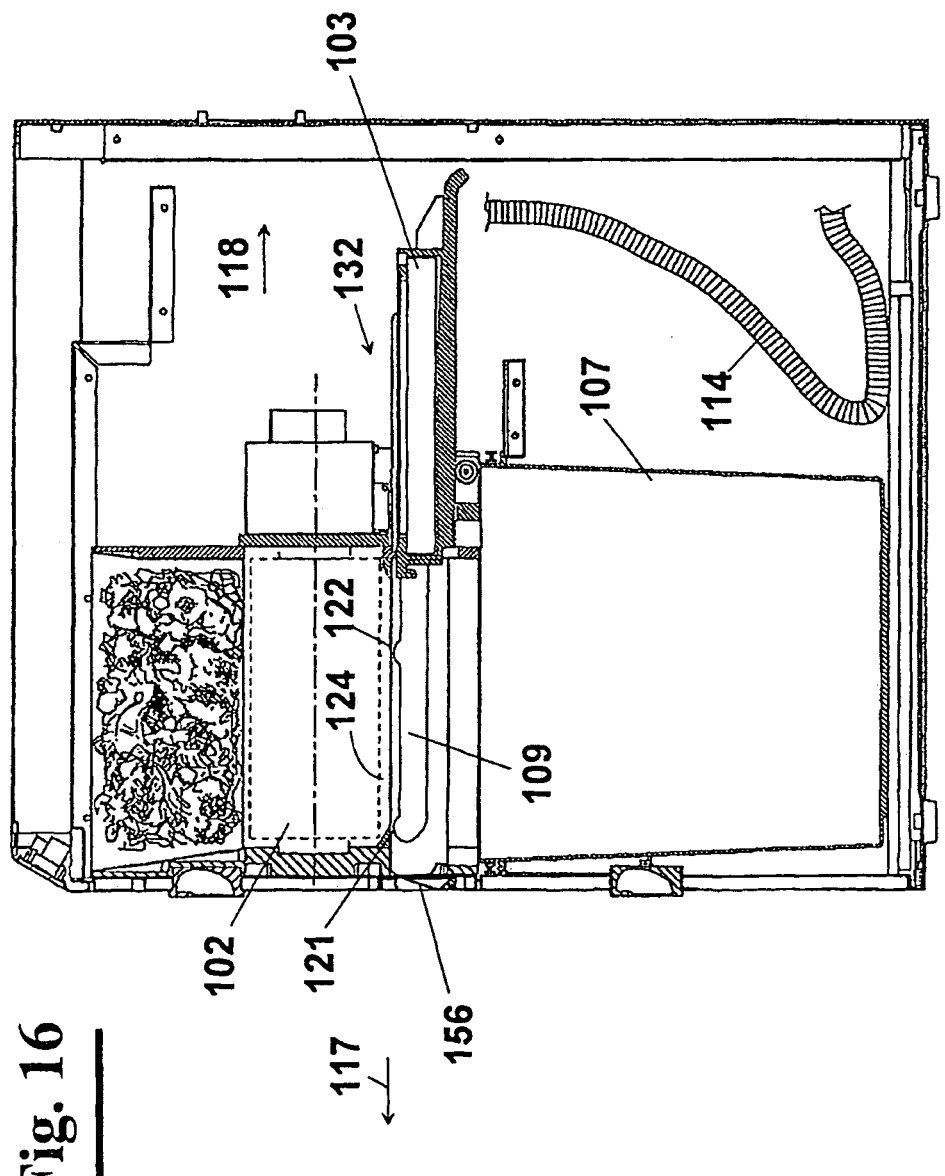
FIG. 16 is a view similar to FIG. 14 illustrating the apparatus in a condition of being ready for grinding the waste residues and for allowing the ground waste to reach the storing section, like FIG. 4.

With reference to FIGS. 14-16, concerning a second embodiment of the invention, plate structure 100 is a support structure that carries all the essential members constituting a waste loading section 101, a grinding section 102, and a collection container 103.

Plate structure 100 supports a loading container 104, where a user can put waste residues W as shown in FIG. 15. Loading container 104 acts as a resistant lining and as a chute for the waste residues that are loaded in loading section 101. When container 104 needs to be cleaned or replaced, it can be manually put into place or removed from portion 100*a* of plate structure 100. Loading container 104 can be made of a corrosion and wear resistant metal like stainless steel.

Support bearings (not shown) for rotation of grinding rollers 105 and 105' (see also FIG. 21), which are suitable for grinding the solid waste, are assembled on front portion 100*b* and back portion 100*c* of plate structure 100. Back portion 100*c* also supports the motor and gear unit 106 for driving rotation of grinding rollers 105 and 105'. The grinding rollers have a cylindrical configuration and rotate opposite to each other, as indicated by arrows A and A' in FIG. 21, respectively for grinding rollers 105 and 105'. Center axles 145 and 146 respectively of grinding rollers 105 and 105' extend between ball bearings assembled on the front and back portions of plate structure 100 (see also the dashed line representation of grinding roller 105' in FIG. 14)

Figure 20:
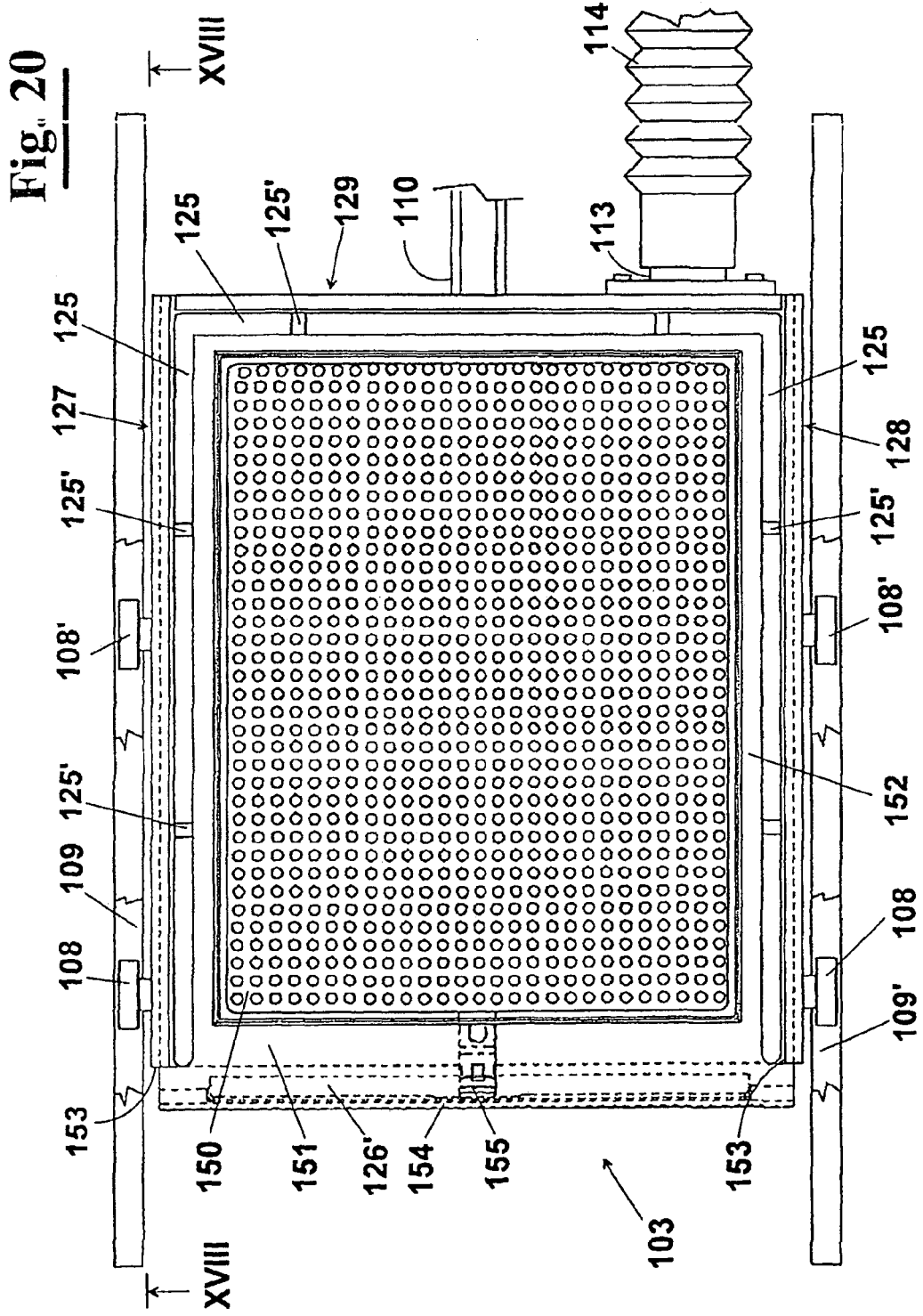
FIG. 20 is a plan view as seen according to arrows 20-20 of FIG. 17 with certain parts omitted for reasons of clarity.
Figure 21:
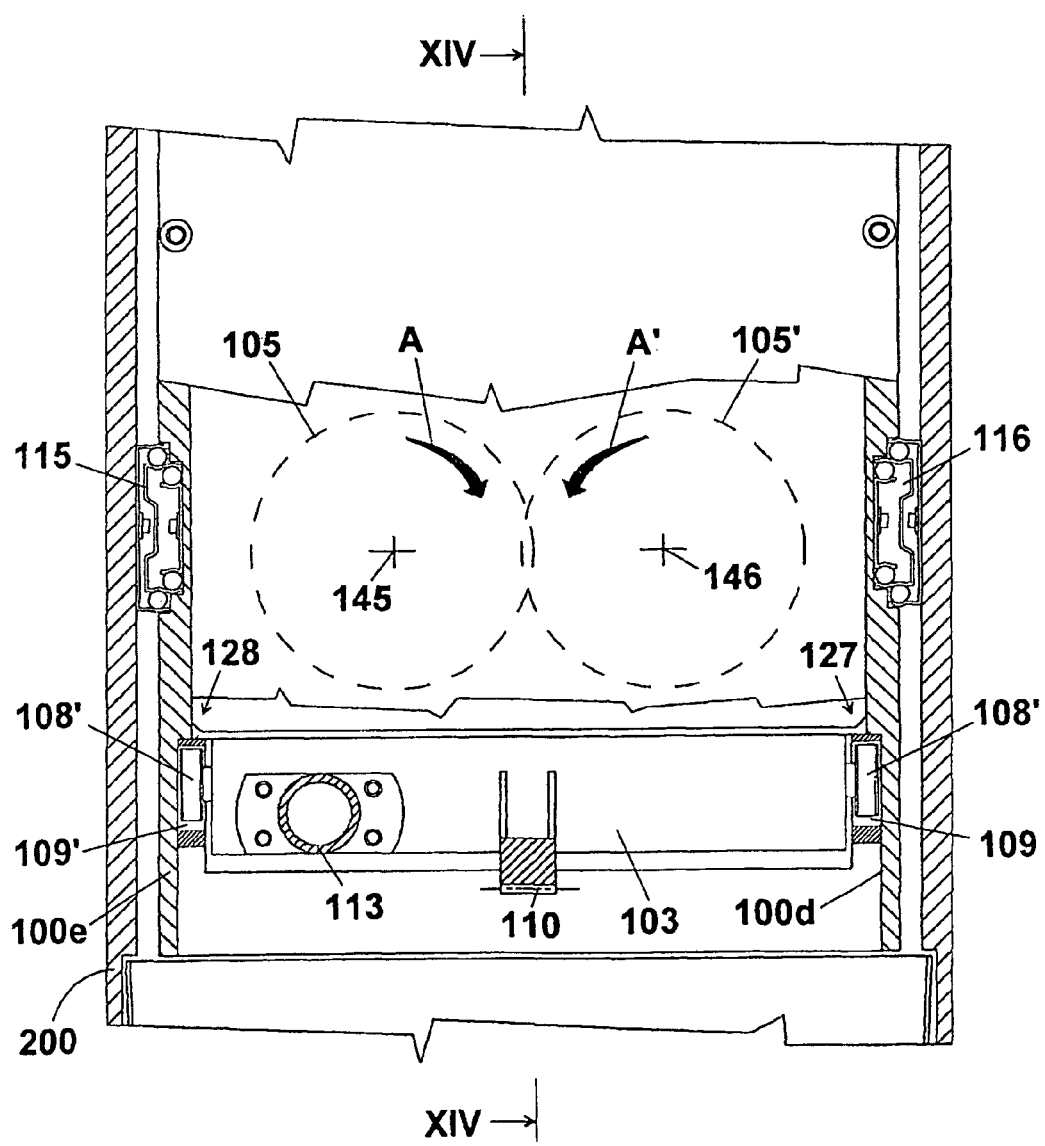
FIG. 21 is a view as seen according to arrows 21-21 of FIG. 14

Collection container 103 is equipped with support rollers 108 and 108' assembled on respective support pins of the side walls of collection container 103 (see also FIGS. 18, 20 and 21). Rollers 108 and 108' support the collection container in grooves 109 and 109' located respectively on side walls 100*d* and 100*e* of plate structure 100 (see also FIG. 21).

Rack portion 110, which is a part of collection container 103 and is located centrally, can mesh with pinion gear 111 of motor gear unit 112. Motor gear unit 112 can be fixed to bar 112', which is a transverse structural connection between side walls 100*d* and 100*e* of plate structure 100 (see for example FIGS. 17 and 19).

Motor gear unit 112 can be actuated in both ways of rotations to translate rack portion 110, and therefore to move collection container in either directions 117 or 118 (i.e. directions perpendicular to front and back portions of plate structure 100). In this way, collection container can be displaced from a relative position 131, i.e. directly below the grinding section (see also FIGS. 14 and 15), to a far away relative position 132 (see also FIG. 16), where passage 124 of grinding section 102 is left completely open for access of the ground waste to storage container 107. Collection container 103 can also be stationary in intermediate positions between relative positions 131 and 132, for reasons that are explained in detail below.

Collection container 103 is equipped with tube portion 113 for discharging liquid from collection container 103 (see FIGS. 20 and 21). Tube portion 113 is connected by means of a flexible tube 114 to a waste discharge system or deposit tank (not shown). Bottom 103' of collection container 103 is appropriately sloped to cause the liquid to be forwarded into tube 113 for being discharged.

Storage container 107 is located directly below the position of collection container 103, when the latter is directly below the grinding section in relative position 131 (see position 120 shown in FIGS. 14 and 17). Storage container 107 can be lined with a disposal bag for collecting the ground waste coming from grinding unit 102. Storage container 107 can be supported by a trolley arrangement (not shown) which allows the user to withdraw the storage container up to the dashed line position 107', shown in FIG. 14, for removal and replacement of the disposal bag Plate structure 100 is supported on a casing 200 of the apparatus by a guides and rollers arrangement 115 and 116 (see also FIG. 21). This arrangement allows plate structure 100 to translate along a direction 117, and also in an opposite direction 118. As mentioned, these directions are perpendicular to front portion 100*b* and back portion 100*c* of plate structure 100, and are also perpendicular to the front and back side walls of casing 200, as shown for example in FIGS. 14 16 and 21.

A handle 160 can be structurally linked to front portion 100*b* for allowing the user to pull plate structure 100 in the direction of arrow 117 to cause plate structure 100 to occupy position 119 illustrated in FIG. 15, which is a position outside casing 200. This also produces the result that loading section 101, grinding section 102, and collection container 103 are relatively aligned in position 119 so that collection container 103 is in the first relative position 131, with respect to and directly below the grinding section. Furthermore as shown in FIG. 15, in position 119 loading section 101 is directly accessible by the user for loading the waste residues W in the apparatus. At the same time collection container 103 is aligned for collecting any liquid residues coming from loading section 101 and dropping through grinding section 102.

Successively, plate structure 100 can be pushed back in the direction of arrow 118 to occupy position 120. In position 120, all the sections are within casing 200 and collection container can still be in the first relative position 131 directly below the grinding section (see FIG. 14). In other words, as shown in FIGS. 14 and 15, loading section 101, grinding section 102, and collection container 103 can be aligned with each other according to a common alignment condition, due to lack of relative movement between these sections when moving between positions 119 and 120.

As already stated, liquid residues can drop from grinding section 102 when the user loads the waste, as shown in FIG. 14 for position 119. Similarly, liquid can be dropping from the grinding section in position 120, when washing the grinding rollers with jet devices (not shown), or when spraying the waste with disinfectant solutions. Application of a disinfectant to the waste is normally carried out just before grinding the waste residues with grinding rollers 105 and 105'.

When collection container 103 is located directly below grinding section 102, as shown for positions 119 and 120, rollers 108 and 108' can be positioned in portions 121 and 122 of grooves 109 and 109'. Portions 121 and 122 are respective tracks for rollers 108 and 108', which cause collection container 103 to move upwards in the direction of arrow 117' towards grinding section 102 (see FIGS. 17, 18, 19 and 21). This can occur at the end of the motion of collection container 103 in the direction of arrow 117 to reach the relative position 131 of the collection container with the grinding section. The definite alignment condition of collection container 103 with the grinding section has rollers 108 abutting against the end sides of portions 121. In this condition, an edge 123 of passage 124 of grinding section 102 engages with groove 125 of collection container, while shelf 126 of collection container abuts against frontal surface 126' of support plate 100 (see FIG. 17). Movement of the rollers in the tracks is caused by actuating motor gear unit 112. Roller 108 is kept in abutment at the end of portion 121, when motor gear unit 112 is not actuated, by the gear ratio of motor gear unit 112. This condition locks the collection container in relative position 131, which is a condition necessary for moving the loading section, the grinding section and the collection container as an aligned unit between alignment positions 119 and 120, as described with reference to FIGS. 14 and 15

Passage 124 is a portion of support plate 100 and is needed for conveying the waste residues from grinding section 102 to storage container 107, and also for the flow of the liquid parts towards collection container 103. Edge 123 can be an end of passage 124.

Edge 123 can extend continuously along side walls 127 and 128 and back wall 129 of the apparatus (see FIGS. 17, 19, 20 and 21). Collection container can be equipped with a groove 125 extending practically for a same extension in order to receive the entire length of edge 123 (see FIG. 20).

By the engagement of edge 123 in groove 125, when the collection container is aligned with grinding section 102 in relative position 131, a labyrinth seal is formed between the collection container and the grinding section to prevent liquid residues from leaving passage 124. In relative position 131, also the abutment of shelf 126 with surface 126' acts as a seal that avoids liquid from leaking into the area of passage 124.

When moving collection container in the direction of arrow 118 to reach relative position 132 in order to block passage 124 (see FIGS. 16 and 19), the rollers run back along portions 121 and 122. This initially causes collection container to move away from grinding section 102, causing edge 123 to exit from groove 125, thus allowing the movement of collection container 103 in the direction of arrow 118.

Figure 19:
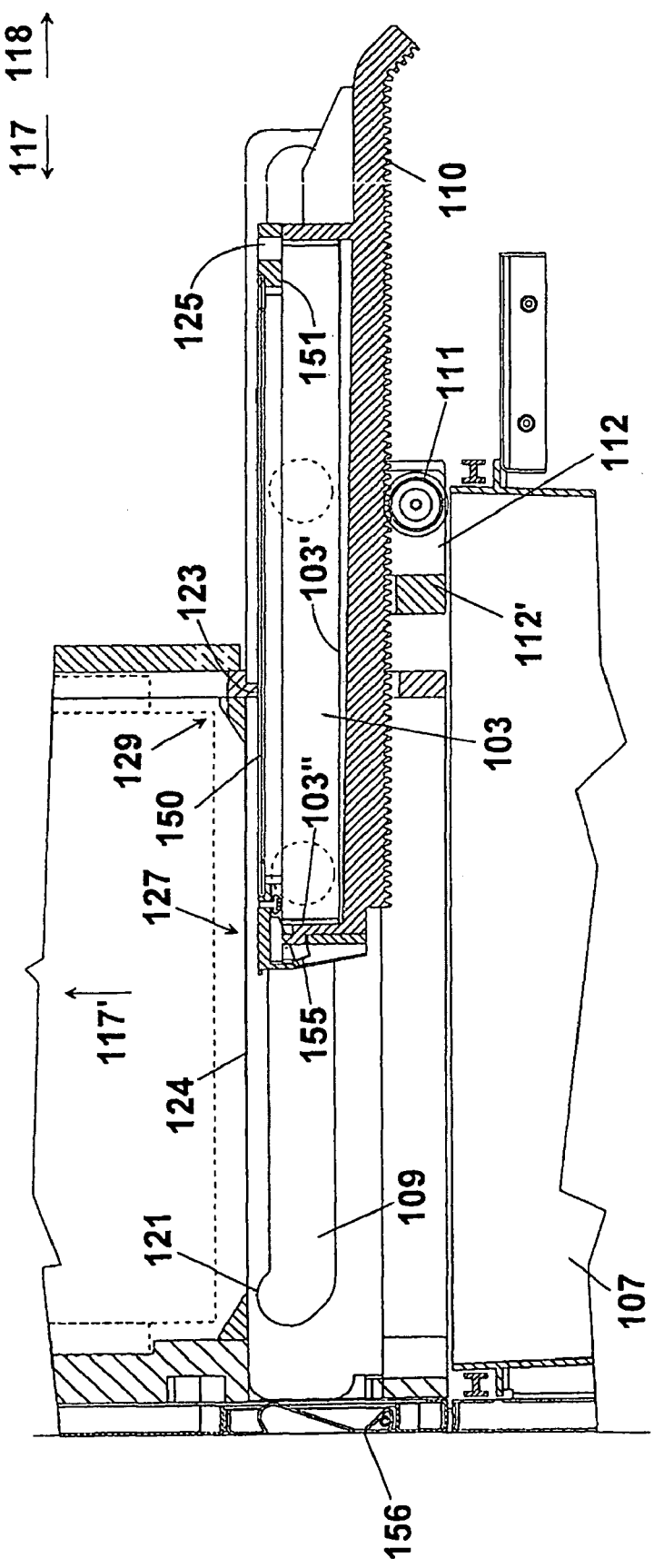
FIG. 19 is a view similar to FIG. 17 illustrating the collection container moving to reach the position of FIG. 16

During movement of collection container 103 in the direction of arrow 118, while the rollers are rolling in straight portion 109a of grooves 109 and 109', the portion of edge 123 on back side 126 scrapes a grate surface 150 for removing any remaining residues and let them fall in storage container 107 (see particularly FIG. 19).

Grate surface 150 can be the upper surface of a grate member 151, which can be assembled on collection container 103, as shown for example in FIGS. 17, 19 and 20. Grate member 151 can be formed from frame structure 152 in such a way that grate surface 150 occupies a central aperture thereof. Groove 125, which is adapted to receive edge 123, is a passage of the frame structure and leads to collection container 103. Ribs 125' are reinforcing structural links for frame structure 152 to compensate the discontinuity created by groove 125. Grate member 151 can slide into lateral slots 153 of collection container 103 in order to stay in place above collection container 103. Front surface 154 of frame structure 152 abuts a front portion 103" of collection container to definitely position grate member 151 above collection container 103 Lateral slots 153 are parallel to the directions indicated by arrows 117 and 118 when the collection container is assembled in the apparatus. A catch lever 155 made of spring metal can secure grate member 151 to collection container 103.

When grate surface 150 has to be cleaned, catch lever 155 can be lifted in the direction of arrow 117' (see FIG. 19) to unlock grate member 151, and therefore to remove it from collection container 103. Then, grate member 151 can be pulled in the direction of arrow 117 up to disengage from lateral slots 153. This can be achieved through a door 156 of casing 200 (see FIGS. 16 and 19).

Prior to lifting catch 155, collection container 103 needs to be not far from position 120 and slightly distanced from the grinding section to cause edge 123 to be out of groove 125. This can be achieved by actuating gear drive 112 for a small rotation, which will cause rollers 108 and 108' to come out of portions 121 and 122 of grooves 109 and 109'. In this condition, collection container 103 occupies an intermediate position between relative positions 131 and 132 near to door 156.

An electronic drive board and a motor actuator unit 161 are provided to control motor gear unit 112 and automatic sequences performed by the apparatus. In particular, unit 161 guarantees the automatic movement of collection container 103 described in the foregoing.

The foregoing description of specific embodiments will so fully reveal the invention according to the conceptual point of view, so that others, by applying current knowledge, will be able to modify and/or adapt for various applications such embodiments without further research and without departing from the invention, and it is therefore to be understood that such adaptations and modifications will have to be considered as equivalent to the specific embodiment. The means and the materials to realise the different functions described herein could have a different nature without, for this reason, departing from the field of the invention. It is to be understood that the phraseology or terminology employed herein is for the purpose of description and not of limitation.

The invention claimed is:

1. Apparatus for treating organic waste comprising from the above to below:
   a loading section equipped with a container for loading the waste to be treated;
   a grinding section comprising means for grinding waste arriving from the loading section;
   a storing section for storing waste that has been ground in the grinding section;
   a moveable collection container for collecting liquid parts of the waste, wherein the collection container is located between the grinding means and the storing section; and
   means for moving the collection container between a barrier position, preventing access of the waste towards the storing section, and an access position that allows the waste to reach the storing section.

2. Apparatus according to claim 1 wherein the collection container is connected to a waste tube for conveying the liquid parts of the waste.

3. Apparatus according to claim 1 wherein the movement of the collection container between the barrier position and the access position is driven by a second motor means and a second transmission means.

4. Apparatus according to claim 3 wherein the second transmission means is selected from the group comprised of:
   a rack gear,
   a ballscrew,
   a belt transmission, and
   a chain transmission.

5. Apparatus according to claim 1 wherein the movement of the collection container between the barrier position and the access position is driven by an actuator of a type selected from the group comprised of:
   pneumatic,
   hydraulic, and
   a combination of pneumatic and hydraulic.

6. Apparatus according to claim 1, wherein the grinding means are driven by third motor means, which are connected to said grinding means by coupling means; the grinding means being removable from the apparatus independently of said third motor means.

7. Apparatus according to claim 6 wherein the grinding means are assembled to slide on reference guides, said reference guides aligning and assisting an engagement of said grinding means with respect to said coupling means.

8. Apparatus according to claim 1 further comprising a grate member positioned between the grinding means and the storing section wherein the grate member prevents passage of waste solid residues and without obstructing the passage of liquid inside the collection container the grate member being adapted to be easily accessible from outside and extracted once the grinding means have been removed.

9. Apparatus according to claim 1 further comprising:
   means for supporting the loading section, the grinding section and the collection container as an aligned unit; and
   means for moving said unit between a first position for loading the waste to be treated and a second position for grinding the waste to be treated.

10. Apparatus according to claim 9 where the collection container when forming said unit is in said barrier position and wherein the access position of the collection container, for allowing access to the storing section, is a position displaced from said unit.

11. Apparatus according to claim 9 wherein the means for supporting comprises a common plate structure for supporting the loading section, the grinding section and the collection container; and wherein the means for moving comprises slide and guide members assembled between a frame structure of the apparatus and the means for supporting.

12. Apparatus according to claim 11 wherein said slide and guide members are assembled on side walls of the apparatus in such a way that the first position is a frontal position of the apparatus.

13. Apparatus according to claim 1 wherein the means for moving the collection container further comprises a motorized pinion engaged with a rack arrangement; and wherein the rack arrangement is part of the collection container.

14. Apparatus according to claim 1 wherein the means for moving the collection container further comprises a roller running in a slot.

15. Apparatus according to claim 1 comprising a passage structure for conveying the waste from the grinding section to the storing section; wherein the passage structure comprises an edge portion; and the collection container further comprises a seat portion for receiving the edge portion to seal the passage structure.

16. Apparatus according to claim 15 wherein the means for moving the collection container further comprises means for moving the edge portion into the seat portion of the collection container.

17. Apparatus according to claim 15 wherein the means for moving the collection container provides a first component of motion to align the collection container with the grinding section and a second component of motion for receiving the edge portion in the seat portion.

18. Apparatus according to claim 17 wherein the means for moving the collection container comprises a roller running on a cam surface, said cam surface being configured for providing said first and second components of motion.

19. Apparatus according to claim 15 wherein the collection container further comprises a grate surface located within the perimeter of the seat portion.

20. Apparatus according to claim 19 wherein the edge portion scrapes the grate surface when the collection container moves to the access position for allowing the waste to access the storing section.

* * * * *

UNITED STATES PATENT AND TRADEMARK OFFICE
CERTIFICATE OF CORRECTION

PATENT NO. : 7,926,749 B2  
APPLICATION NO. : 12/306139  
DATED : April 19, 2011  
INVENTOR(S) : Marco Santandrea Page 1 of 1

It is certified that error appears in the above-identified patent and that said Letters Patent is hereby corrected as shown below:

In the Specifications

Column 2, line 51, "gears" should be -- gears; --;

Column 2, line 53, "belts" should be -- belts; --;

Column 2, line 54, "chains" should be -- chains. --;

Column 4, line 55, after "turning" should be inserted -- on --;

Column 6, line 46, "14" should be -- 14, --; and

Column 8, line 15, "103" should be -- 103. --.

Signed and Sealed this  
Thirtieth Day of July, 2013

Teresa Stanek Rea  
*Acting Director of the United States Patent and Trademark Office*